United States Patent
Dayal et al.

(10) Patent No.: US 11,624,625 B2
(45) Date of Patent: Apr. 11, 2023

(54) SYSTEM AND METHOD FOR EVALUATION OF A ROUTE SCORE FOR AN ELECTRIC VEHICLE AND ELECTRIC VEHICLE FLEETS

(71) Applicant: Electriphi Inc, San Francisco, CA (US)

(72) Inventors: Sanjay Dayal, San Francisco, CA (US); Muffaddal Ghadiali, San Francisco, CA (US)

(73) Assignee: Electriphi Inc, San Francisco, CA (US)

( * ) Notice: Subject to any disclaimer, the term of this patent is extended or adjusted under 35 U.S.C. 154(b) by 225 days.

(21) Appl. No.: 17/160,976

(22) Filed: Jan. 28, 2021

(65) Prior Publication Data

US 2022/0236067 A1 Jul. 28, 2022

(51) Int. Cl.
*G01C 21/34* (2006.01)
*G08G 1/00* (2006.01)

(52) U.S. Cl.
CPC ....... *G01C 21/3492* (2013.01); *G01C 21/343* (2013.01); *G08G 1/20* (2013.01)

(58) Field of Classification Search
None
See application file for complete search history.

(56) References Cited

U.S. PATENT DOCUMENTS

| | | | | |
|---|---|---|---|---|
| 11,479,142 | B1 * | 10/2022 | Govan | B60L 58/12 |
| 2007/0027593 | A1 * | 2/2007 | Shah | B60W 50/00 |
| | | | | 702/33 |
| 2008/0249667 | A1 * | 10/2008 | Horvitz | B60W 40/072 |
| | | | | 701/1 |
| 2010/0094496 | A1 * | 4/2010 | Hershkovitz | B60L 53/14 |
| | | | | 701/22 |
| 2011/0246004 | A1 * | 10/2011 | Mineta | B60W 20/11 |
| | | | | 903/903 |
| 2013/0179057 | A1 * | 7/2013 | Fisher | B60L 53/66 |
| | | | | 701/1 |
| 2013/0261914 | A1 * | 10/2013 | Ingram | B64C 39/024 |
| | | | | 701/423 |

(Continued)

FOREIGN PATENT DOCUMENTS

| CN | 108171820 A | 6/2018 |
|---|---|---|
| CN | 111401690 A | 7/2020 |

*Primary Examiner* — Ryan Rink
(74) *Attorney, Agent, or Firm* — Jason C. Cameron (57) ABSTRACT

A system and method for evaluation of a route score for an electric vehicle are disclosed. The system includes a route path characteristic score computation subsystem configured to compute a route path characteristic score of one or more routes between two or more distant locations based on one or more topological parameters and one or more scheduled activity parameters, a traffic score computation subsystem configured to compute a traffic score in real-time, an environment score computation subsystem configured to compute an environment score in the real-time, an overall route score computation subsystem configured to compute an overall route score in the real-time, a vehicle-level route score computation subsystem configured to compute a vehicle-level route score for a particular electric vehicle, an overall fleet-level route score computation subsystem configured to compute an overall fleet-level route score after aggregating the vehicle-level route score.

8 Claims, 5 Drawing Sheets

(56) References Cited

U.S. PATENT DOCUMENTS

| | | | |
|---|---|---|---|
| 2015/0298680 A1* | 10/2015 | Matthews | B60W 10/08 |
| | | | 180/65.265 |
| 2017/0307391 A1* | 10/2017 | Mason | G08G 1/202 |
| 2018/0143029 A1* | 5/2018 | Nikulin | G01C 21/3415 |
| 2018/0143639 A1* | 5/2018 | Singhal | G06Q 30/0269 |
| 2019/0178678 A1* | 6/2019 | Rahbari Asr | B60L 53/66 |
| 2019/0220036 A1 | 7/2019 | Weslosky et al. | |
| 2019/0383637 A1* | 12/2019 | Teske | B60L 53/65 |
| 2020/0070679 A1* | 3/2020 | Wang | B60W 10/26 |
| 2020/0117204 A1* | 4/2020 | Lindemann | B60W 60/0023 |
| 2020/0133306 A1 | 4/2020 | Chadha et al. | |
| 2020/0134735 A1 | 4/2020 | Carver et al. | |
| 2020/0191589 A1* | 6/2020 | Tamai | G01C 21/3697 |
| 2020/0219070 A1* | 7/2020 | Rosenzweig | G07C 5/085 |
| 2020/0391612 A1* | 12/2020 | Lee | G01C 21/3469 |
| 2021/0061278 A1* | 3/2021 | Zhao | B60W 40/06 |
| 2021/0063181 A1* | 3/2021 | Saleh | G01C 21/3446 |
| 2021/0065073 A1* | 3/2021 | Maeda | H04L 67/52 |
| 2021/0389145 A1* | 12/2021 | Liu | B60L 50/60 |
| 2022/0049973 A1* | 2/2022 | Quint | G01C 21/362 |
| 2022/0204050 A1* | 6/2022 | Taveira | G01C 21/3415 |
| 2022/0228877 A1* | 7/2022 | Feldman | B60L 53/305 |

* cited by examiner

SYSTEM AND METHOD FOR EVALUATION OF A ROUTE SCORE FOR AN ELECTRIC VEHICLE AND ELECTRIC VEHICLE FLEETS

FIELD OF INVENTION

Embodiments of a present disclosure relate to electric vehicles, and more particularly to a system and a method for evaluation and recommendation of a route score for an individual electric vehicle, and within the context of the operations of a fleet of electric vehicles.

BACKGROUND

An electric vehicle, uses one or more electric motors or traction motors for propulsion, and batteries that provide the energy source in the form of electrical energy. Due to the change in energy source and drivetrain, parameters governing the suitability of a route taken by an electric vehicle are very different from gasoline or a diesel vehicle. Therefore, optimizing which route to take between two or more locations for the electric vehicle plays a very important role in determination of the suitability of the route or conversely to calculate the best available route based on the electric vehicle and electric vehicle fleet characteristics.

Currently available automated routing systems select routes based on criteria that are suited to gasoline or diesel vehicles. Using these traditional systems leads to sub-optimal utilization of the electric vehicle or the electric vehicle fleet as a whole. Alternatively, selecting a route manually requires significant human intervention and inefficient outcomes which affect the efficient utilization of each electric vehicle and the overall fleet.

Other conventional systems can determine route suitability based on simplistic factors such as route gradient. However, such systems are unable to provide efficient outcomes as factors that directly impact optimized selection of the route are highly constrained and not adapted to the unique characteristics of a specific electric vehicle and a fleet as a whole. Moreover, such systems are unable to incorporate any details on external factors such as weather, topology and others in real time, which affect daily operational costs as well as longer term cost of ownership of each electric vehicle and the fleet as a whole.

Hence, there is a need for a system and a method for evaluation of a route score for an electric vehicle and the fleet in order to address the aforementioned issues.

BRIEF DESCRIPTION

In accordance with an embodiment of the disclosure, a system for evaluation of a route score for an electric vehicle is disclosed. The system includes one or more processors. The system includes a route path characteristic score computation subsystem operable by one or more processors. The route path characteristic score computation subsystem is configured to compute a route path characteristic score of one or more routes between two or more distant locations based on one or more topological parameters and one or more scheduled activity parameters. The system also includes a traffic score computation subsystem communicatively coupled to the route path characteristic score computation subsystem and operable the one or more processors. The traffic score computation subsystem is configured to compute a traffic score of the one or more routes between the two or more distant locations based on one or more traffic parameters in real-time. The system also includes an environment score computation subsystem communicatively coupled to the traffic score computation subsystem and operable by the one or more processors. The environment score computation subsystem is configured to compute an environment score of the one or more routes between the two or more distant locations based on one or more environmental parameters in the real-time.

Further, the system also includes an overall route score computation subsystem operable by the one or more processors. The overall route score computation subsystem is configured to compute an overall route score of the one or more routes between two or more distant locations based on the route path characteristic score, the traffic score and the environment score in the real-time. The system also includes a vehicle-level route score computation subsystem communicatively coupled to the overall route score computation subsystem and operable by the one or more processors. The vehicle-level route score computation subsystem is configured to compute a route score for a particular electric vehicle based on how the route path characteristic score, the traffic score and the environment score will affect the particular electric vehicle. The system also includes an overall fleet-level route score computation subsystem communicatively coupled to the vehicle-level route score computation subsystem. The overall fleet-level route score computation subsystem is configured to compute an overall fleet-level route score after aggregating the vehicle-level route score of the plurality of electric vehicles present in a fleet.

In accordance with another embodiment of the disclosure, a method for evaluation of a route score for an electric vehicle is disclosed. The method includes computing a route path characteristic score of one or more routes between two or more distant locations based on one or more topological parameters and one or more scheduled activity parameters. The method includes computing a traffic score of the one or more routes between the two or more distant locations based on one or more traffic parameters in real-time. The method includes computing an environment score of the one or more routes between the two or more distant locations based on one or more environment parameters in the real-time.

The method includes computing an overall route score of the one or more routes between the two or more distant locations based on the route path characteristic score, the traffic score and the weather score in the real-time. The method includes computing a route score for a particular electric vehicle based on how the route path characteristic score, the traffic score and the environment score will affect the particular electric vehicle. The method includes computing an overall fleet-level route score after aggregating the vehicle-level route score of the plurality of electric vehicles present in a fleet.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF DRAWINGS

The disclosure will be described and explained with additional specificity and detail with the accompanying figures in which.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated system, and such further applications of the principles of the disclosure as would normally occur to those skilled in the art are to be construed as being within the scope of the present disclosure.

The terms "comprise", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, sub-systems, elements, structures, components, additional devices, additional sub-systems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

Embodiments of the present disclosure relate to a system and a method for evaluation of a route score for an electric vehicle. The system includes a route path characteristic score computation subsystem operable by one or more processors. The route path characteristic score computation subsystem is configured to compute a route path characteristic score of one or more routes between two or more distant locations based on one or more topological parameters and one or more scheduled activity parameters. The system also includes a traffic score computation subsystem communicatively coupled to the route path characteristic score computation subsystem and operable by the one or more processors. The traffic score computation subsystem is configured to compute a traffic score of the one or more routes between the two or more distant locations based on one or more traffic parameters in real-time. The system also includes an environment score computation subsystem communicatively coupled to the traffic score computation subsystem and operable by the one or more processors. The environment score computation subsystem is configured to compute an environment score of the one or more routes between the two or more distant locations based on one or more environment parameters in the real-time.

Further, the system also includes an overall route score computation subsystem operable by the one or more processors. The overall route score computation subsystem is configured to compute an overall route score of the one or more routes between the two or more distant locations based on the route path characteristic score, the traffic score and the environment score in the real-time. The system also includes a vehicle-level route score computation subsystem communicatively coupled to the overall route score computation subsystem and operable by the one or more processors. The vehicle-level route score computation subsystem is configured to compute a route score for a particular electric vehicle based on how the route path characteristic score, the traffic score and the environment score will affect the particular electric vehicle. The system also includes an overall fleet-level route score computation subsystem communicatively coupled to the vehicle-level route score computation subsystem. The overall fleet-level route score computation subsystem is configured to compute an overall fleet-level route score after aggregating the vehicle-level route score of the plurality of electric vehicles present in a fleet.

Figure 1:
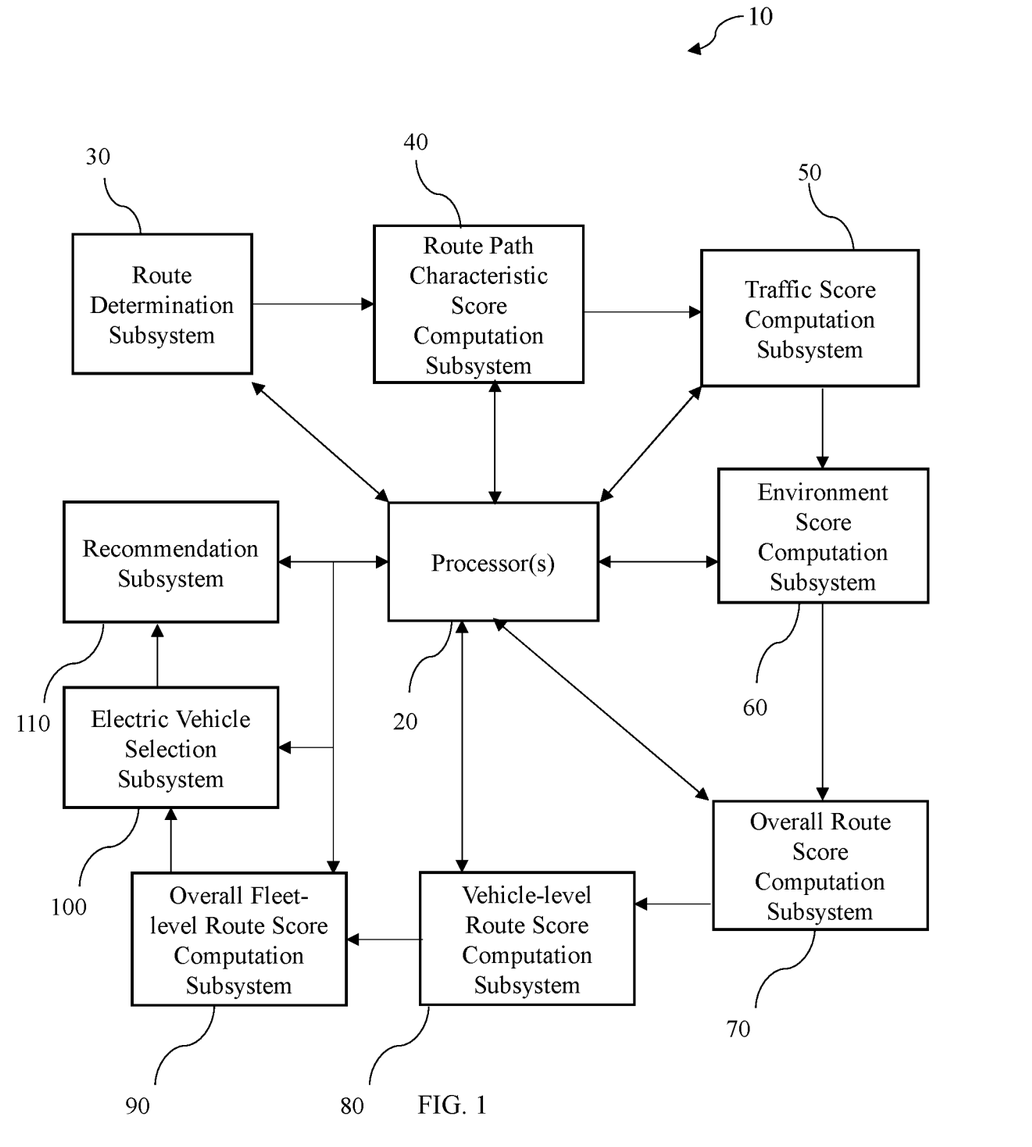
FIG. 1 is a block diagram representation of the system for evaluation of a route score for an electric vehicle or a fleet of electric vehicles in accordance with an embodiment of the present disclosure.

FIG. 1 is a block diagram representation of the system 10 for evaluation of a route score for an electric vehicle in accordance with an embodiment of the present disclosure. The system 10 includes a route determination subsystem 30 operable by the one or more processors 20. The route determination subsystem 30 determines a number of possible routes between two distinct locations. In one embodiment, the system 10 is hosted on a server. In such an embodiment, the server may include a cloud server.

Further, the system 10 includes a route path characteristic score computation subsystem 40 communicatively coupled to the route determination subsystem 30 and operable by one or more processors 20. The route path characteristic score computation subsystem 40 computes a route path characteristic score of one or more routes determined by the route determination subsystem 30 between the two or more distant locations based on one or more topological parameters and one or more scheduled activity parameters. In one specific embodiment, operation of the electric vehicle may depend on the one or more topological parameter and the one or more scheduled activity parameters that directly impact battery performance of the electric vehicle. In such embodiments, the one or more topological parameters may include a route gradient and the like. In one embodiment, the route gradient may include an angle of inclination of a section of a road. In one specific embodiment, the route gradient may include an upward inclination, a flat surface, a downward inclination, and the like. In such embodiment, the upward inclination may include hilly terrain and the like. In another embodiment, the flat surface may include straight roads, deserts and the like. In one embodiment, the one or more scheduled activity parameters may include number of stops during a particular route, duration of stops, number of recharging stops and the like.

Further, in such embodiment, the number of stops during the particular route may include number of traffic signal stops and the like. In one embodiment, a value of the route gradient may vary in accordance with variation of the route gradient on a route. In one specific embodiment, the route path characteristic score computation subsystem 40 may compute the route path characteristic score of the route based on the values of the route gradient associated with the route by using one or more functions. In such embodiment, the one or more functions may include addition, multiplication, division, subtraction and the like.

Further, the system 10 includes a traffic score computation subsystem 50 communicatively coupled to the route path characteristic score computation subsystem 40 and operable by the one or more processors 20. The traffic score computation subsystem 50 computes a traffic score of the one or more routes between the two or more distant locations based on one or more traffic parameters in real-time. In such embodiment, the one or more traffic parameters may include a heavy traffic, a medium traffic, a low traffic and the like. In one specific embodiment, if there is heavy traffic on a route then an electric vehicle may apply brakes more often which assists in recharging of the battery associated with the electric vehicle based on a regenerative braking technique. As used herein, the term regenerative braking technique' refers to an energy recovery mechanism that slows down a moving vehicle or object by converting its kinetic energy into a form that can be either used immediately or stored until needed. In one embodiment, each of the one or more traffic parameters may be assigned a predefined value. In one specific embodiment, the traffic score computation subsystem 50 may compute the traffic score based on the predefined value assigned to the one or more traffic parameters by using the one or more functions.

Further, the system 10 includes an environment score computation subsystem 60 communicatively coupled to the traffic score computation subsystem 50 and operable by the one or more processors 20. The environment score computation subsystem 60 computes an environment score of the one or more routes between the two or more distant locations based on one or more environment parameters in the real-time. In such embodiment, the one or more environment parameters may include percentage environmental humidity, temperature, air quality index and the like. In one embodiment, higher temperature may cause faster discharge of the battery in the electric vehicle. In another embodiment, extreme cold weather may cause slower discharge of the battery of the electric vehicle. In one specific embodiment, each of the one or more environment parameters may be assigned the predefined value. In one embodiment, the environment score computation subsystem 60 may compute the environment score based on the predefined value of each of the one or more environment parameters by using the one or more functions.

Further, the system 10 includes an overall route score computation subsystem 70 operable by the one or more processors 20. The overall route score computation subsystem 70 computes an overall route score of the one or more routes between the two or more distant locations based on the route path characteristic score, the traffic score and the environment score in the real-time. In one specific embodiment, the overall route score computation subsystem 70 may aggregate the route path characteristic score, the traffic score and the environment score to compute the overall route score. In one embodiment, if the overall route score of the particular route is more than another route then the particular route may be more efficient for the electric vehicle to travel between the two distinct locations. In another embodiment, if the overall route score of the particular route is less than the other route then the particular route may be less efficient for the electric vehicle to travel between the two distinct locations.

Further, the system 10 includes a vehicle-level route score computation subsystem 80 communicatively coupled to the overall route score computation subsystem 70 and operable by the one or more processors 20. The vehicle-level route score computation subsystem 80 computes a route score for a particular electric vehicle based on how the route path characteristic score, the traffic score and the environment score will affect the particular electric vehicle. In one embodiment, the vehicle-level score may depend on one or more characteristics of the electric vehicle. In such embodiment, the one or more characteristics of the electric vehicle may include battery charge and discharge history, maintenance history, driving records of the electric vehicle and the like. In one embodiment, the driving records may include a past performance history of the electric vehicle travelling on different routes with different parameters. In another embodiment, the driving records may include a past performance of the driver associated with the vehicle.

Further, the system 10 includes an overall fleet-level route score computation subsystem 90 communicatively coupled to the vehicle-level route score computation subsystem 80 and operable by the one or more processors 20. The overall fleet-level route score computation subsystem 90 computes an overall fleet-level route score after aggregating the vehicle-level route score of the plurality of electric vehicle present in a fleet. In one embodiment, the overall fleet-level score may depend on one or more fleet characteristics. In such embodiment, the one or more fleet characteristics may include past history of the fleet, type of routes chosen by the fleet, weather and other environmental conditions where the fleet is operating and the like. In such embodiment, the past history of the fleet may include a past performance of a particular fleet while travelling on different routes with different parameters.

Further, the system 10 includes an electric vehicle selection subsystem 100 operable by the one or more processors 20. The electric vehicle selection subsystem 100 selects one or more electric vehicles for a particular route based on the vehicle-level route score and the overall fleet-level route score using one or more machine learning models. In one specific embodiment, the one or more machine learning models may be first trained by using training data to perform the selection of the one or more electric vehicles for the particular route. In such embodiment, the training data may include past performance data of the one or more electric vehicles, pas performance data of one or more fleets, data associated with the plurality of routes and the like. In one embodiment, the user may decide a type of selection of the one or more electric vehicles. In such embodiment, the type of selection may include a manual selection by the user, an automatic selection of the one or more electric vehicles by the system and the like.

Further, the system 10 includes a recommendation subsystem 110 operable by the one or more processors 20. The recommendation subsystem 110 generates one or more recommendations based on the overall route score, the overall fleet-level route score and the vehicle-level route score. In such embodiment, the one or more recommendations may include but not limited to pending maintenance of one or more electric vehicles, best-fit route, best-fit electric vehicle for the particular route, best time to travel on the particular route for the one or more electric vehicles and the like. In one embodiment, the best-fit route may include a route with the highest route score. In another embodiment, the best-fit electric vehicle may include the one or more electric vehicles with the highest vehicle-level route score and the highest fleet-level route score associated with the one or more electric vehicles. In one specific embodiment, the recommendation subsystem 110 may recommend the user to or the fleet operator to modify the particular route to improve the fleet-level route score. In another embodiment, the recommendation subsystem 110 may recommend the user to select a different electric vehicle for that route based on the vehicle's battery characteristics to improve the vehicle-level route score.

Figure 2:
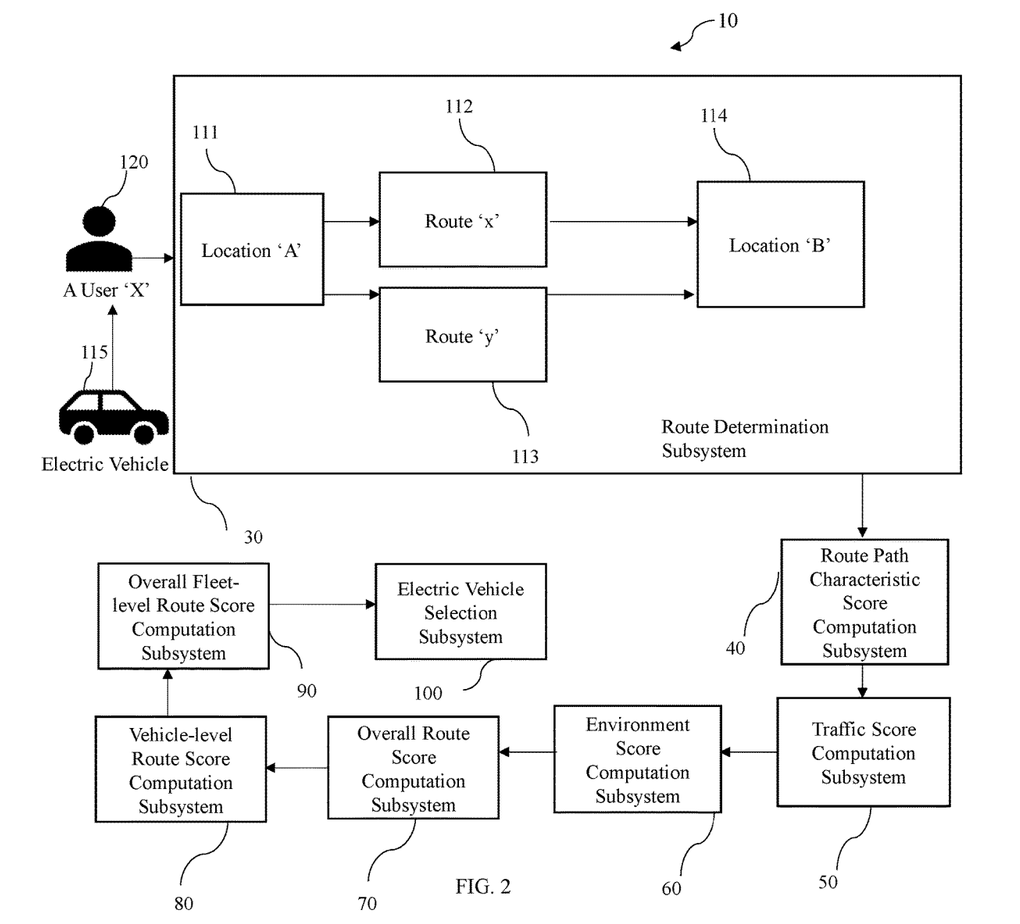
FIG. 2 is an exemplary embodiment representing a block diagram of the system for evaluation of a route score for an electric vehicle or a fleet of electric vehicles of FIG. 1 in accordance with an embodiment of the present disclosure.

FIG. 2 is an exemplary embodiment representing a block diagram of the system 10 for evaluation of a route score for an electric vehicle of FIG. 1 in accordance with an embodiment of the present disclosure. The user 'X' 120 wants to operate between two or more distinct locations which are from location 'A' 111 to location 'B' 114 with an electric vehicle 115. Further, the system 10 determines three different routes which are route 'x' 112 and route 'y' 113 from the location 'A' 111 to the location 'B' 114, by the route determination subsystem 30. The route 'x' 112 is a topologically high variance terrain, low traffic, cold weather and with no charging stations to recharge the battery of the electric vehicle. The route 'y' 113 is topologically flat, medium traffic, high temperature and three charging stations to recharge the battery of the electric vehicle.

Further, the system computes the route path characteristic score for the route 'x' 112 and the route 'y' 113 based on the one or more topological parameters and the one or more scheduled activity parameters associated with the route 'x' 112 and the route 'y' 113. Since the route 'x' 112 has a hilly terrain which provides for higher regeneration of energy, thus recharging the electric vehicle battery by using the regenerative braking technique. Moreover, the route 'y' 113 has a highway route which does not provide high regeneration due to a flat nature of the topology. Therefore, the route 'x' 112 has a higher topological score relative to the route 'y' 113. Further, the system computes the scheduled activity score based on the one or more scheduled activity parameters associated with the route 'x' 112 and the route 'y' 113. Additionally, the route 'x' 112 has no charging stations and the route 'y' 113 has three charging stations, the scheduled activity score of the route 'x' 112 will be higher than the route 'y' 113. After computing the scheduled activity score and the topological score, the system will compute the route path characteristic score by applying a function to the value associated with the topological score and the scheduled activity score of the route 'x' 112 and route 'y' 113, by the route path characteristic score computation subsystem 40.

Further, the system computes a traffic score associated with the route 'x' 112 and the route 'y' 113 based on the one or more traffic parameters. Since the route 'x' 112 has heavy traffic and the route 'y' 113 has medium traffic therefore the value associated with the route 'x' 112 will be more than the value associated with the route 'y' 113. After receiving the values associated with the route 'x' 112 and the route 'y' 113, the system will apply the function and compute the traffic score based on the values associated with the route 'x' 112 and the route 'y' 113, by the traffic score computation subsystem 50. After computing the traffic score, the system will compute the environment score for the route 'x' 112 and the route 'y' 113. As the route 'x' 112 has cold weather which may drain the battery of the electric vehicle a lot faster than the route 'y' 113. The route 'y' 113 has high ambient temperature which may result in higher battery temperatures that impact battery discharge of the electric vehicle and as there are three available charging stations on the route 'y' 113, therefore the electric vehicle can be charged while the electric vehicle is on the route. Hence, the value associated with the route 'y' 113 will be more than the route 'x' 112. Further, the system will apply the function to compute the environment score for the route 'x' 112 and the route 'y' 113 based on the values, by the environment score computation subsystem 60.

Furthermore, the system 10 calculates an overall route score for each of the route 'x' 112 and the route 'y' 113 by aggregating the route path characteristic score, the traffic score and the environment score in real-time, by the overall route score computation subsystem 70. After aggregating the score, the route 'x' 112 score is C and the route 'y' 113 score is D, wherein the overall route score of the route 'y' 113 is more than the route 'x' 112 which computes that the route 'y' 113 is more efficient than the route 'x' 112. Further, the system 10 computes a vehicle-level route score for a particular electric vehicle based on how the route path characteristic score, the traffic score and the environment score will affect the electric vehicle associated with user 'X' performance, battery life and the like, by the vehicle-level route score computation subsystem 80. As the battery state of charge of the electric vehicle is moderate, which means the electric vehicle can travel for six hours continually without requiring a recharge, but the total travel time is ten hours which requires the electric vehicle to recharge at the electric vehicle charging station. After calculating the vehicle-level route score, the route with higher vehicle-level route score becomes more efficient than the route with lower vehicle-level route score. The route 'y' 113 has more vehicle-level route score than the route 'x' 112. Further, the system selects the route 'y' 113 for the electric vehicle to travel from the location 'A' to location 'B', by the electric vehicle selection subsystem 100.

Figure 3:
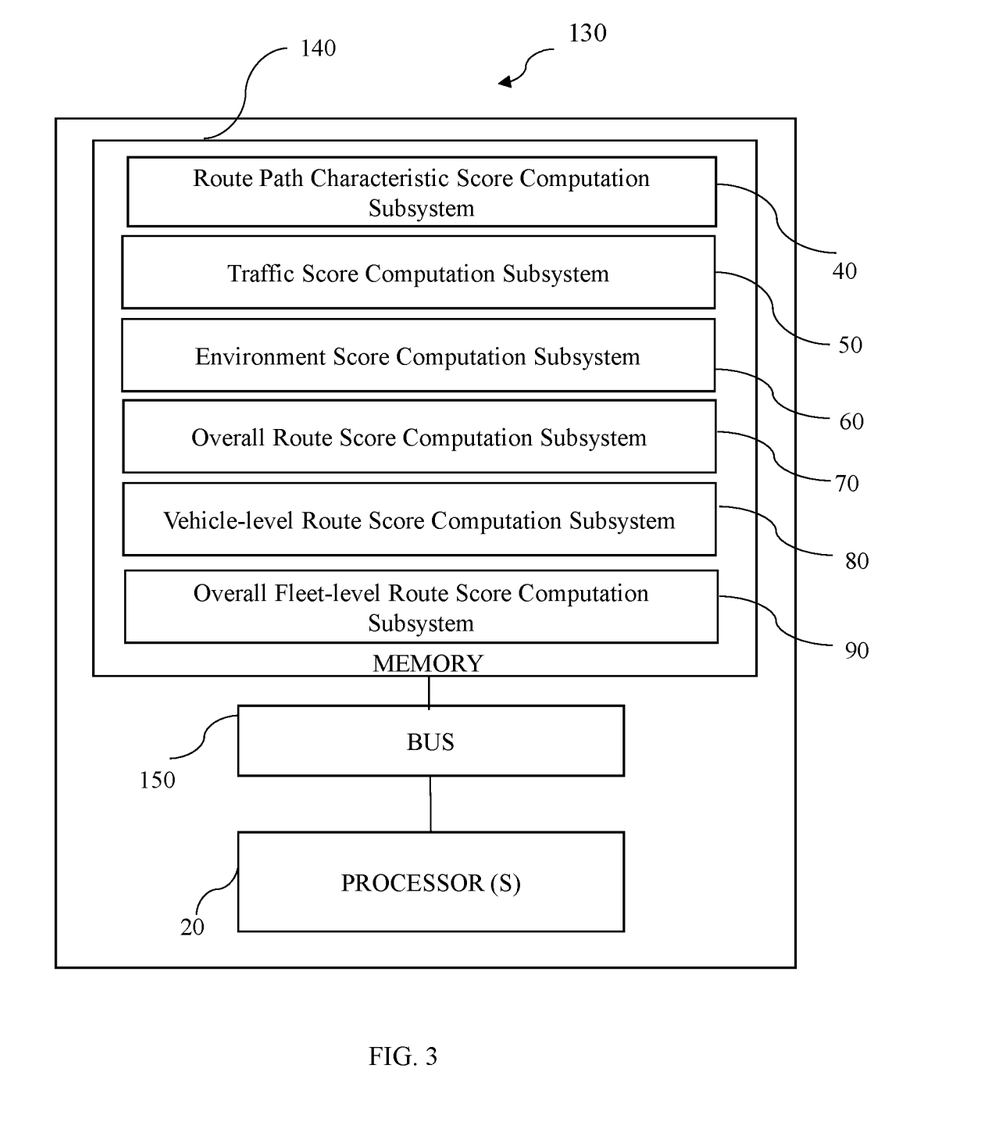
FIG. 3 is a block diagram representation of an evaluation computer system or a server in accordance with an embodiment of the present disclosure.

FIG. 3 is a block diagram representation of an evaluation computer system 130 or a server in accordance with an embodiment of the present disclosure. The computer system 100 includes processor(s) 20, and memory 140 coupled to the processor(s) 20 via a bus 150.

The processor(s) 20, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof.

The memory 140 includes multiple units stored in the form of an executable program which instructs the processor 20 to perform the configuration of the system illustrated in FIG. 2. The memory 140 has following subsystems: a route path characteristic score computation subsystem 40, a traffic score computation subsystem 50, an environment score computation subsystem 60, an overall route score computation subsystem 70, a vehicle-level route score computation subsystem 80 and a fleet-level route score computation subsystem 80 of FIG. 1.

Computer memory 140 elements may include any suitable memory device(s) for storing data and executable programs, such as read-only memory, random access memory, erasable programmable read-only memory, electrically erasable programmable read-only memory, hard drive, removable media drive for handling memory cards and the like. Embodiments of the present subject matter may be implemented in conjunction with program subsystems, including functions, procedures, data structures, and application programs, for performing tasks, or defining abstract data types or low-level hardware contexts. The executable program stored on any of the above-mentioned storage media may be executable by the processor(s) 20.

The route path characteristic score computation subsystem 40 instructs the processor(s) 20 to compute a route path characteristic score of one or more routes between two or more distant locations based on one or more topological parameters and one or more scheduled activity parameters. The traffic score computation subsystem 50 instructs the processor(s) 20 to compute a traffic score of the one or more routes between the two or more distant locations based on one or more traffic parameters in real-time. The environment score computation subsystem 60 instructs the processor(s) 20 to compute an environment score of the one or more routes between the two or more distant locations based on one or more environment parameters in the real-time.

The overall route score computation subsystem 70 instructs the processor(s) 20 to compute an overall route score of the one or more routes between the two or more distant locations based on the route path characteristic score, the traffic score and the environment score in the real-time. The vehicle-level route score computation subsystem 80 instructs the processor(s) 20 to compute a route score for a particular electric vehicle based on how the route path characteristic score, the traffic score and the environment score will affect the particular electric vehicle. The overall fleet-level route score computation subsystem 80 instructs the processor(s) 20 to compute an overall fleet-level route score after aggregating the vehicle-level route score of the plurality of electric vehicles present in a fleet.

Figure 4A:
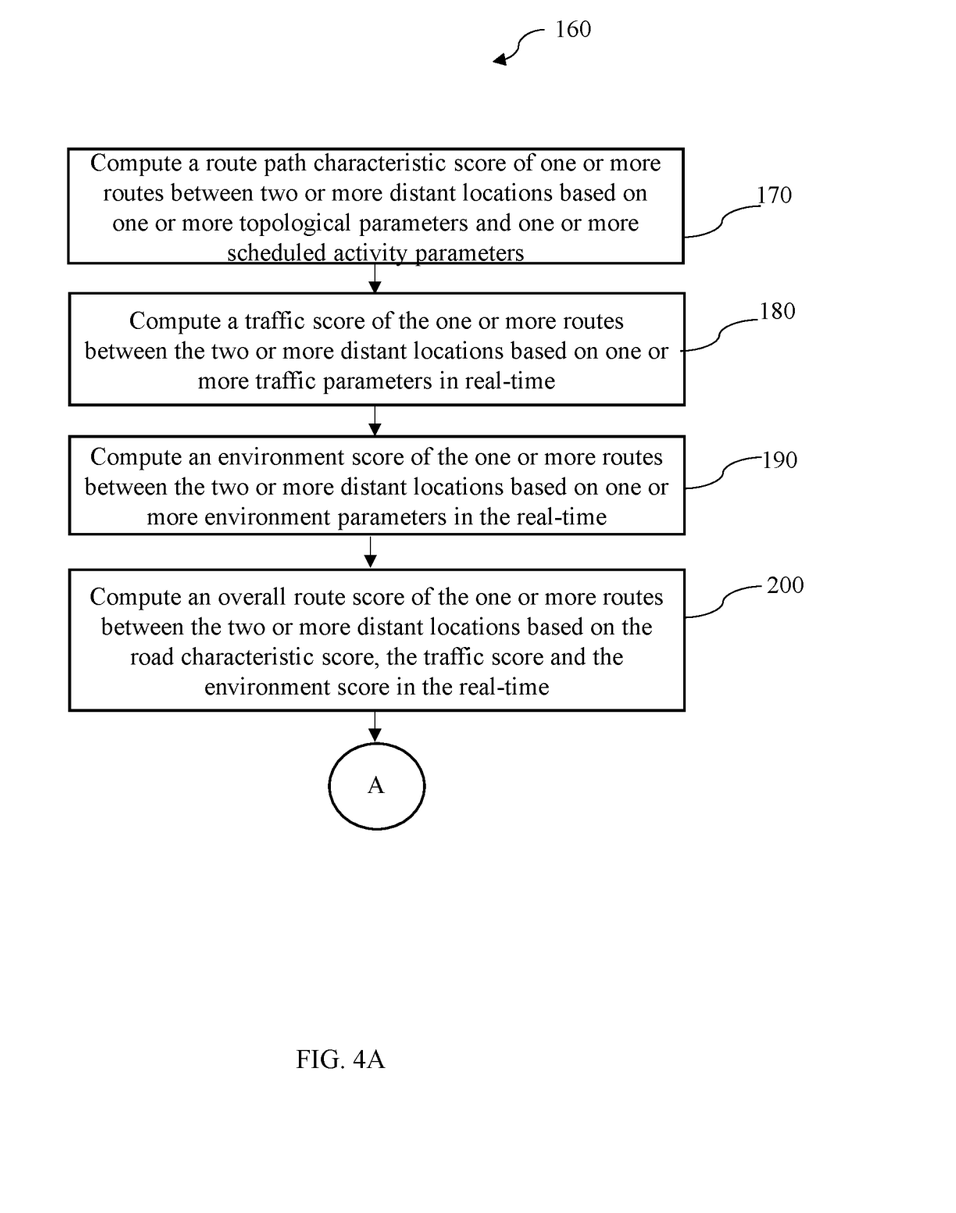
FIG. 4A and FIG. 4B are flow diagrams representing steps involved in a method for evaluation of a route score for an electric vehicle in accordance with an embodiment of the present disclosure.
Figure 4B:
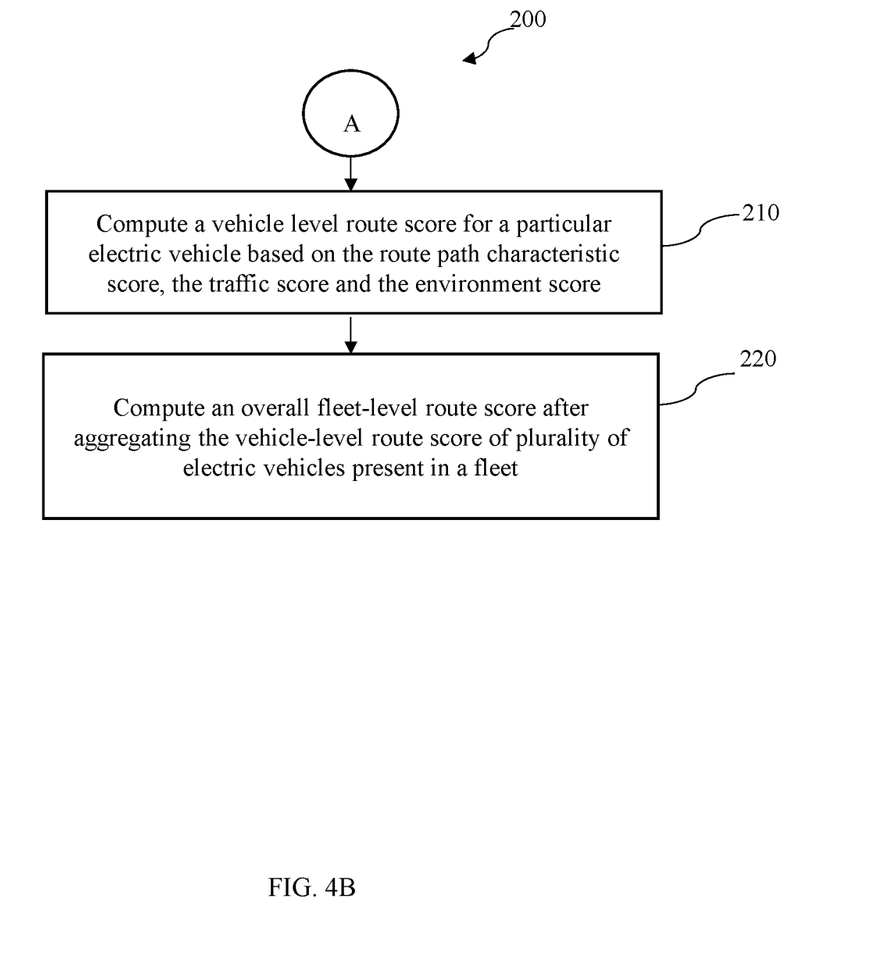

FIG. 4A and FIG. 4B are flow diagrams representing steps involved in a method 160 for evaluation of a route score for an electric vehicle in accordance with an embodiment of the present disclosure. The method 160 includes determining, by a route determination subsystem, a number of possible routes between two distinct locations.

Further, the method 160 includes computing, by a route path characteristic score computation subsystem, a route path characteristic score of one or more routes determined by the route determination subsystem between the two or more distant locations based on one or more topological parameters and one or more scheduled activity parameters in step 170. In one embodiment, computing the route path characteristic score based on the one or more topological parameters includes computing the route path characteristic score based on a route gradient. In a specific embodiment, the route gradient may include a topological variance of a section of a road. In an exemplary embodiment, the topological variance may include a high slope, a flat surface, a low slope and the like. In another embodiment, the high slope may include a hilly terrain and the like. In another embodiment, the flat surface may include straight roads, highways, and the like. In one embodiment, the one or more scheduled activity parameters may include number of stops during a particular route, duration of stops, number of recharging stops and the like on the route.

Further, in such embodiment, computing based on the number of stops during the particular route may include computing based on the number of traffic signal stops and the like. In one embodiment, the method 160 may include varying a value of the route gradient in accordance with variation of the route gradient on a route. In one specific embodiment, the method 160 may include computing the route path characteristic score of the route based on the values of the route gradient associated with the route by using one or more functions. In such embodiment, computing by using one or more functions may include computing by using addition, multiplication, division, subtraction and the like.

Further, the method 160 includes computing, by a traffic score computation subsystem, a traffic score of the one or more routes between the two distant locations based on one or more traffic parameters in real-time in step 180. In such embodiment, computing based on the one or more traffic parameters may include computing based on a heavy traffic, a medium traffic, a low traffic and the like. In one specific embodiment, the method 160 may include applying brakes more often due to traffic and road conditions, which may assist in recharging of a battery associated with the electric vehicle based on a regeneration braking technique. In one embodiment, the method 160 may include assigning each of the one or more traffic parameters a predefined value. In one specific embodiment, the method 160 may include computing the traffic score based on the predefined value assigned to the one or more traffic parameters by using the one or more functions.

Further, the method 160 includes computing, by an environment score computation subsystem, an environment score of the one or more routes between the two or more distant locations based on one or more environment parameters in the real-time in step 190. In such embodiment, computing based on the one or more environment parameters may include computing based on percentage environmental humidity, temperature, air quality index and the like. In one embodiment, the method 160 may include analyzing health of the electric vehicle during high temperatures. In another embodiment, the method 160 may include charge and discharge characteristics of the battery of the electric vehicle in extreme cold weather. In one specific embodiment, the method 160 may include assigning each of the one or more traffic parameters based on a predefined value. In one embodiment, the method 160 may include computing the traffic score based on the predefined value of each of the one or more traffic parameters by using the one or more functions. Further, the method 160 includes computing, by an overall route score computation subsystem, an overall route score of the one or more routes between the two or more distant locations based on the route path characteristic score, the traffic score and the environment score in the real-time in step 200. In one specific embodiment, the method 160 may include aggregating the route path characteristic score, the traffic score and the environment score to compute the overall route score.

Further, the method 160 includes computing, by a vehicle-level route score computation subsystem, a route score for a particular electric vehicle based on how the route path characteristic score, the traffic score and the environment score will affect the particular electric vehicle in step 210. In one embodiment, the method 160 may include computing the vehicle-level route score on one or more characteristics of the electric vehicle. In such embodiment, the one or more characteristics of the electric vehicle may include data analysis of a battery life, last maintenance of the vehicle and the battery, past history of the vehicle and the battery, a driver associated with the electric vehicle and the like. In one embodiment, depending on the past history may include a past performance history of the electric vehicle while travelling on different kinds of routes with different parameters. In another embodiment, depending on the driver associated with the electric vehicle may include depending on a past performance of the driver associated with the vehicle or a fleet.

Further, the method 160 includes computing, by an overall fleet-level route score computation subsystem, an overall fleet-level route score after aggregating the vehicle-level route score of plurality of electric vehicle present in a fleet in step 220. In one embodiment, the method 160 may include computing the overall fleet-level route score on one or more fleet characteristics. In such embodiment, the one or more fleet characteristics may include data analysis of a past history of the fleet, type of routes chosen by the fleet, weather conditions under which the fleet is operating and the like. In one embodiment, analysis of the past history of the fleet may include a data analysis of a past performance of a particular fleet while travelling on the different kinds of routes with the different parameters.

Further, the method 160 includes selecting, by an electric vehicle selection subsystem, one or more electric vehicles for a particular route based on the vehicle-level route score and the overall fleet-level route score using one or more machine learning models. In one specific embodiment, the method 160 may include training the one or more machine learning models by using training data to perform the selection of the one or more electric vehicles for the particular route. In such embodiment, using the training data may include using past performance data of the one or more electric vehicles, one or more fleets, data associated with the plurality of routes and the like. In one embodiment, the method 160 may include deciding a type of selection of the one or more electric vehicles. In such embodiment, deciding the type of selection may include deciding a manual selection by the user, automatic selection of the one or more electric vehicles and the like.

Further, the method 160 includes generating, by a recommendation subsystem, one or more recommendations based on the overall route score, the overall fleet-level route score and the vehicle-level route score. In such embodiment, generating the one or more recommendations may include generating pending maintenance of one or more electric vehicles, best-fit route, best-fit electric vehicle for the particular route, best time to travel on the particular route for the one or more electric vehicles and the like. In one embodiment, generating the best-fit route may include generating a route with the highest route score. In another embodiment, generating the best-fit electric vehicle may include generating the one or more electric vehicles with the highest vehicle-level route score and the highest fleet-level route score associated with the one or more electric vehicles. In one specific embodiment, the method 160 may include recommending particular route modifications to the user or a fleet operator to improve the fleet-level route score. In another embodiment, the method 160 may include recommending the fleet operator to deploy a different electric vehicle based on the battery characteristics of the electric vehicle to improve the vehicle-level route score.

Various embodiments of the present disclosure provide a technical solution to the problem for evaluation of route score for an electric vehicle and an electric vehicle fleet. The present system by computing a route score for plurality of routes between two or more distinct locations which helps in determining an optimal path from a plurality of paths. Further, the current system also computes vehicle-level route score after computing sub-scores related to that path, which helps in monitoring and operations of a fleet of electric vehicles in the field of vehicle fleet and energy management. Further, the system also provides a fleet-level route score for more efficient results in optimizing the route selection process for a user or a fleet operator.

While specific language has been used to describe the disclosure, any limitations arising on account of the same are not intended. As would be apparent to a person skilled in the art, various working modifications may be made to the method in order to implement the inventive concept as taught herein.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, the order of processes described herein may be changed and are not limited to the manner described herein. Moreover, the actions of any flow diagram need not be implemented in the order shown; nor do all of the acts need to be necessarily performed. Also, those acts that are not dependent on other acts may be performed in parallel with the other acts. The scope of embodiments is by no means limited by these specific examples.

We claim:

1. A system for evaluation of a route score for an electric vehicle and an electric vehicle fleet comprising:

a route path characteristic score computation subsystem operable by the one or more processors, wherein the route path characteristic score computation subsystem is configured to compute a route path characteristic score of one or more routes between two or more distant locations based on one or more topological parameters and one or more scheduled activity parameters;

a traffic score computation subsystem communicatively coupled to the route path characteristic score computation subsystem and operable by the one or more processors, wherein the traffic score computation subsystem is configured to compute a traffic score of the one or more routes between the two or more distant locations based on one or more traffic parameters in real-time;

an environment score computation subsystem communicatively coupled to the traffic score computation subsystem and operable by the one or more processors, wherein the environment score computation subsystem is configured to compute an environment score of the one or more routes between the two or more distant locations based on one or more environment parameters in the real-time, wherein the one or more environment parameters comprise a percentage environmental humidity, an ambient temperature and an air quality index; and an overall route score computation subsystem operable by the one or more processors, wherein the overall route score computation subsystem is configured to compute an overall route score of the one or more routes between the two or more distant locations based on the route path characteristic score, the traffic score and the environment score in the real-time;

a vehicle-level route score computation subsystem communicatively coupled to the overall route score computation subsystem and operable by the one or more processors, wherein the vehicle-level route score computation subsystem is configured to compute a route score for a particular electric vehicle based on how the route path characteristic score, the traffic score and the environment score will affect the particular electric vehicle;

an overall fleet-level route score computation subsystem communicatively coupled to the vehicle-level route score computation subsystem, wherein the overall fleet-level route score computation subsystem is configured to compute an overall fleet-level route score after aggregating the vehicle-level route score of plurality of electric vehicle present in a fleet;

an electric vehicle selection subsystem operable by the one or more processors, wherein the electric vehicle selection subsystem is configured to select one or more electric vehicles for a particular route based on the vehicle-level route score and the overall fleet-level route score; and a recommendation subsystem operable by the one or more processors, wherein the recommendation subsystem is configured to generate one or more recommendations based on the overall route score, the overall fleet-level route score and the vehicle-level route score, wherein the one or more recommendations comprise pending maintenance of one or more electric vehicles, best-fit route, best-fit electric vehicle for the particular route and best time to travel on the particular route for the one or more electric vehicles.

2. The system as claimed in claim 1, wherein the one or more topological parameters comprise a route gradient.

3. The system as claimed in claim 1, wherein the one or more traffic parameters comprise a heavy traffic, a medium traffic and a low traffic.

4. The system as claimed in claim 1, wherein the one or more scheduled activity parameters comprise number of stops during a particular route, number of recharging stops and duration of stops.

5. A method for evaluation of a route score for an electric vehicle, the method comprising:

computing, by a route path characteristic score computation subsystem, a route path characteristic score of one or more routes between two or more distant locations based on one or more topological parameters and one or more scheduled activity parameters;

computing, by a traffic score computation subsystem, a traffic score of the one or more routes between the two or more distant locations based on one or more traffic parameters in real-time;

computing, by an environment score computation subsystem, an environment score of the one or more routes between the two or more distant locations based on one or more environment parameters in the real-time, wherein the one or more environment parameters percentage environmental humidity, an ambient temperature and an air quality index;

computing, by an overall route score computation subsystem, an overall route score of the one or more routes between the two or more distant locations based on the route path characteristic score, the traffic score and the environment score in the real-time;

computing, by a vehicle-level route score computation subsystem, a route score for a particular electric vehicle based on how the route path characteristic score, the traffic score and the environment score will affect the particular electric vehicle;

computing, by an overall fleet-level route score computation subsystem, an overall fleet-level route score after aggregating the vehicle-level route score of plurality of electric vehicle present in the fleet;

selecting, by an electric vehicle selection subsystem, one or more electric vehicles for a particular route based on the vehicle-level route score and the overall fleet-level route score; and generating, by a recommendation subsystem, one or more recommendations based on the overall route score, the overall fleet-level route score and the vehicle-level route score, wherein the one or more recommendations comprising pending maintenance of one or more electric vehicles, best-fit route, best-fit electric vehicle for the particular route and best time to travel on the particular route for the one or more electric vehicles within the fleet.

6. The method as claimed in claim 5, wherein the one or more topological parameters comprising a route gradient.

7. The method as claimed in claim 5, wherein the one or more traffic parameters comprising a heavy traffic, a medium traffic and a low traffic.

8. The method as claimed in claim 5, wherein the one or more scheduled activity parameters comprising number of stops during a particular route, number of recharging stops and duration of stops.

* * * * *